E. C. SOUTHWORTH.
FASTENING MEANS.
APPLICATION FILED MAY 3, 1918.
1,275,488.
Patented Aug. 13, 1918.
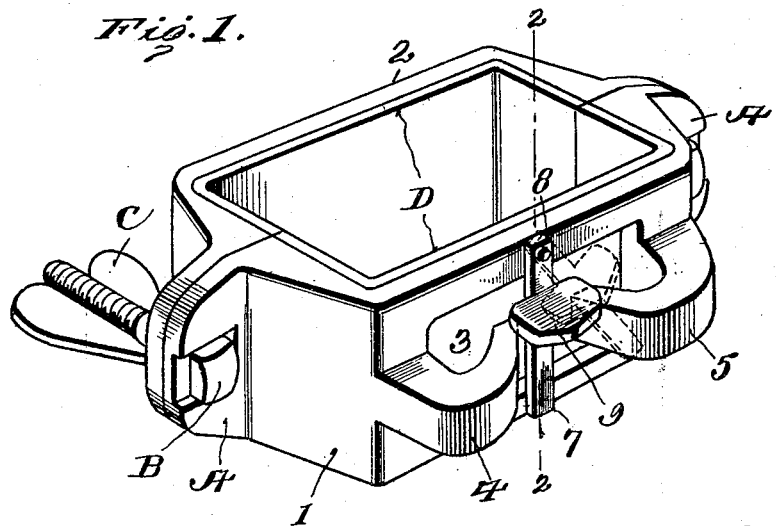
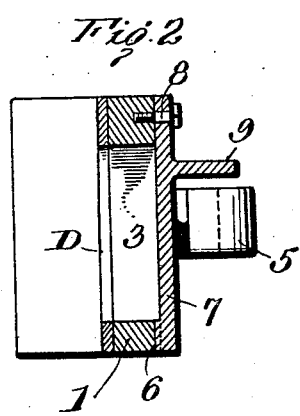
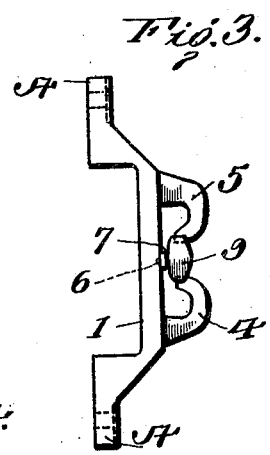
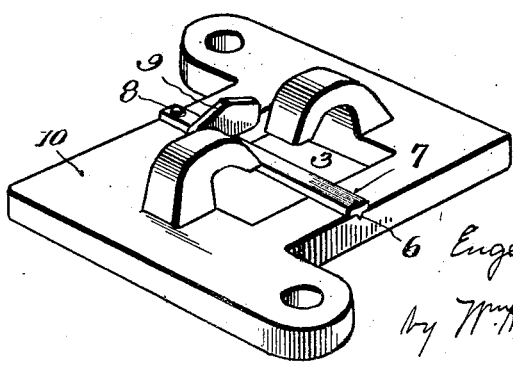
Inventor
Eugene C. Southworth
by Wm H. Babcock & Son
Attorneys

UNITED STATES PATENT OFFICE.

EUGENE C. SOUTHWORTH, OF SOUTHINGTON, CONNECTICUT, ASSIGNOR TO THE STEEL PRODUCTS COMPANY, OF PLANTSVILLE, CONNECTICUT, A CORPORATION OF CONNECTICUT.

FASTENING MEANS.

1,275,488. Specification of Letters Patent. Patented Aug. 13, 1918.

Application filed May 3, 1918. Serial No. 232,264.

*To all whom it may concern:*

Be it known that I, EUGENE C. SOUTHWORTH, a citizen of the United States, residing at Southington, in the county of Hartford and State of Connecticut, have invented certain new and useful Improvements in Fastening Means, of which the following is a specification.

This invention relates to fastening means and is intended, primarily by applicant, for use with anti-skidding chains, of the anchored type, applied to automobile truck wheels and the like, though it can be equally well employed in a number of different arts.

The primary object is to provide a pair of opposed hooks or projections, fixedly mounted with relation to each other, in combination with means for guarding, in normal position, the tips of said hooks or projections against the application or escape of a chain link or other element, said means being resilient and held in normal position by its resiliency, mounted pivotally at a point equi-distant from both of said hooks and movable out of normal position toward or from both of said hooks, in the latter position permitting the application or removal to or from the respective hooks of a chain link or other element. Other objects are to attain the minimum protrusion of the hooks from the face of their plate and at the same time provide sufficient room for the expeditious application or removal of the chain links or other elements to or from said hooks, all of which objects are accomplished by the construction, combination and arrangement of parts hereinafter more particularly set forth, described and claimed.

In the accompanying drawings:

Figure 1 represents a perspective view of a spoke clamp embodying my invention, the guard being indicated in full lines in normal position and in dotted lines in open position for application of a chain link to hook 4;

Fig. 2, a sectional view on the line 2—2 of Fig. 1;

Fig. 3, a top plan view of the clamp-plate 1; and

Fig. 4, a perspective view of a modified form, in which a felly plate is substituted for the spoke clamp of the preferred form.

Referring now in detail to the drawings, 1 designates one clamp plate and 2 the other, both of said plates being provided with perforated end flanges A to receive bolts B on the threaded ends of which the wing nuts C are to be turned and tightened up to draw the plates 1 and 2 tightly together on some intervening object, such as the spoke of an automobile truck wheel.

Both of these plates 1 and 2 are provided with a rubber lining D to guard against marring the object on which they are mounted.

The plate 1 is provided with a large opening 3. A hook 4 is rigidly located on said plate adjacent one end of said opening and a hook 5 is similarly located on said plate adjacent the other end of said opening. Both of these hooks may be formed integral with the plate 1, as shown, and this plate may be either a malleable iron casting, or a drop-forging, or may be of other suitable material.

The lower part of the face of this plate 1 midway between the ends of the opening 3 is provided with a transverse, preferably angular, recess or nick or groove, preferably extending from the edge of said opening 3 to the adjacent edge of the plate, said recess receiving the tooth 6 of the slightly resilient keeper or guard 7 when the latter is in normal position. The tooth 6 may be integral with the keeper 7, as shown. The upper end of this keeper or guard is pivotally mounted on said plate 1, by means of a screw, bolt or similar fastening 8, at a point equi-distant from the adjacent ends of said hooks 4 and 5, and diametrically opposite to the recess above mentioned. This fastening 8 will hold the upper end of the keeper or guard 7 firmly against the face of plate 1, while allowing said keeper or guard to be turned on its pivot in a plane parallel to the plane of said plate and at right angles to the plane of said hooks, between the tips of the latter and said plate.

The guard or keeper 7 is provided with a lug 9, which may be integral as shown, and which is so located on the guard 7 that in normal position it is so close to the tips of both of said hooks as to prevent the passage between it and the tip of either hook of a chain link or similar article, while at the same time it is of such dimensions that in normal position it will bridge the interval between the tips of said hooks, yet may be moved in either direction to its extreme open position without striking against either of said hooks.

The inner faces and tips of the hooks are so formed, as shown, that the tendency of the chain links will be to ride down on the shanks of the hooks, away from the tips, to the junction of said hooks with said plate, thus directing the pull or strain to the strongest point and guarding against possible escape.

In operation, to apply an anti-skidding chain, the guard 7 is turned or rocked on its pivot 8 to the dotted line position shown in Fig. 1, one of the terminal links of said chain is passed over the tip of hook 4, the guard 7 is then turned or rocked to its extreme reverse open position and the other terminal link of said chain is passed over the tip of hook 5, when the keeper 7 is moved to normal, or neutral, position, as shown in full lines in Fig. 1. The resiliency of keeper 7 will hold its tooth 6 firmly in the coöperating recess, preventing accidental displacement of said keeper or guard.

In the modification shown in Fig. 4, a felly plate 10, having a similar opening 3, is substituted for the spoke-clamp of the preferred form, otherwise both forms are the same as to construction and operation.

Having thus described my invention, what I claim as new and desire to secure by Letters Patent is:

1. Two opposed hooks fixedly located with relation to each other, in combination with a guard mounted on a fixed object and adapted to move in a plane at right angles to the plane of said hooks and between the tips of said hooks and said fixed object and adjacent the tips of said hooks to guard the same.

2. A plate provided with two opposed integral hooks and having an opening between the shanks of said hooks and lying under their tips to facilitate the application of chain links thereto, in combination with a keeper mounted pivotally on said plate, adapted to move between said plate and the tips of said hooks, normally lying equi-distant from the tips of said hooks, and provided with a lug which is so located and of such dimensions that in normal position it will be adjacent to the tips of said hooks preventing the passage of a chain link between it and either of the tips of said hooks, while allowing the movement of the keeper to both of its extreme open positions, and means carried by said keeper and engaging said plate to hold said keeper in normal position.

In testimony whereof, I have signed my name to this specification in the presence of two subscribing witnesses.

EUGENE C. SOUTHWORTH.

Witnesses:
  HELEN E. FINNEGAN,
  WARREN D. CHASE.

Copies of this patent may be obtained for five cents each, by addressing the "Commissioner of Patents, Washington, D. C."